United States Patent [19]

Shimano

[11] 4,304,145
[45] Dec. 8, 1981

[54] BRAKE OPERATING DEVICE
[75] Inventor: Keizo Shimano, Sakai, Japan
[73] Assignee: Shimano Industrial Company Limited, Osaka, Japan
[21] Appl. No.: 109,327
[22] Filed: Jan. 3, 1980
[30] Foreign Application Priority Data Jan. 31, 1979 [JP] Japan .............................. 54-12091[U]
Jan. 31, 1979 [JP] Japan .............................. 54-12092[U]

[51] Int. Cl.³ ...................... G05G 11/00; B62K 23/06; B62L 3/02
[52] U.S. Cl. ..................................... 74/480 R; 74/489
[58] Field of Search ...................... 74/480 R, 488, 489

[56] References Cited
U.S. PATENT DOCUMENTS 3,403,577 10/1968 Ozaki .............................. 74/480 R
3,776,061 12/1973 Yoshigai ......................... 74/480 R
3,861,234 1/1975 Cristie ............................. 74/480 R
4,084,449 4/1978 Kine ................................ 74/480 R Primary Examiner—Allan D. Herrmann
Attorney, Agent, or Firm—Stevens, Davis, Miller & Mosher

[57] ABSTRACT

A brake operating device for a bicycle of a drop type handle bar, has a hollow shaft at the foremost end of a main lever supported swingably to a bracket member. The hollow shaft supports a retaining member for one end of a control wire the other end of which is connected to the bicycle brake. An auxiliary lever is supported swingably to the bracket member around a pivot coaxial with a pivot around which the main lever swings, and is provided at the head with an engaging shaft parallel to the common axis of the pivots and engageable with the hollow shaft. The engaging shaft is fit into the hollow shaft to thereby operate the auxiliary lever in association with the main lever.

6 Claims, 11 Drawing Figures

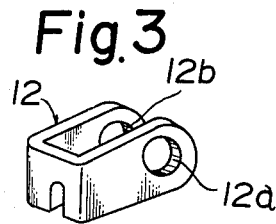
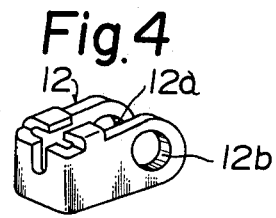
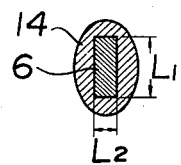
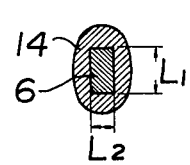
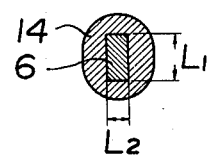
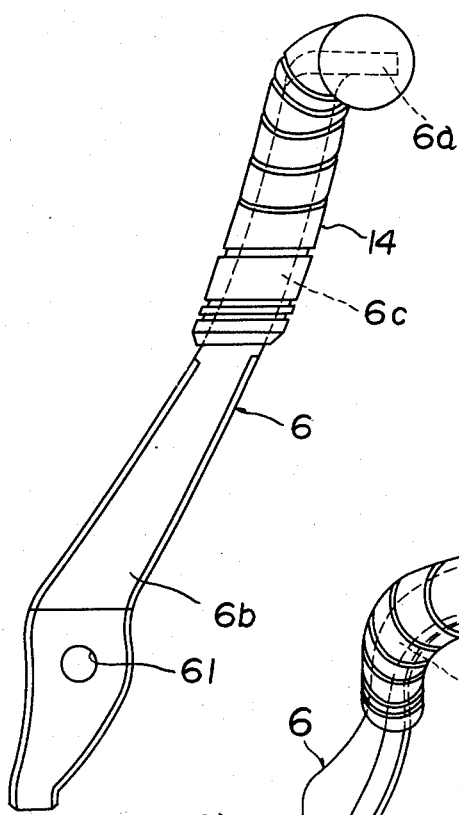
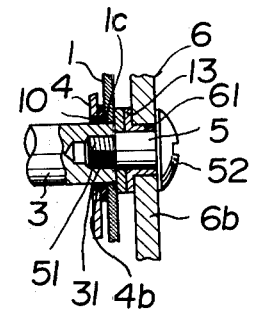
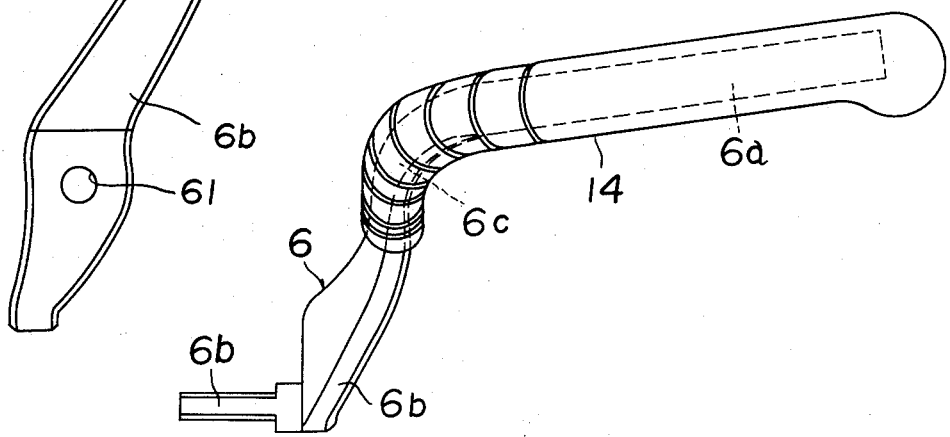

BRAKE OPERATING DEVICE

BACKGROUND AND SUMMARY OF THE INVENTION

This invention relates to a brake operating device adapted to be mounted to a bicycle handle bar, and more particularly to a brake operating device adapted to be mounted to a bicycle drop type handle bar comprising a straight rod section and substantially U-shaped bent rod sections extending forwardly and downwardly from both ends of the straight rod section.

Generally, this kind of brake operating device is provided with a bracket member mounted to the bent rod section of the handle bar, the bracket member carrying a main lever substantially parallel to the bent rod section and an auxiliary lever substantially parallel to the straight rod section and bent rod section, so that a rider may operate the brake by hands gripping the handle bar at the position of either the straight rod section or the bent rod section.

The main lever supports one end of a control wire connected at the other end thereof to the bicycle brake and the auxiliary lever is made operable in association with the main lever. Such means for associating the levers are, as is well-known, disclosed in the British Pat. No. 778,809, and the U.S. Pat. No. 3,403,577 and No. 3,915,028. Namely, the first Patent discloses an auxiliary lever fixed to one side of a main lever through a screw bolt, the second discloses an auxiliary lever supported to an axial end of a pivot swingably supporting a main lever, the auxiliary lever extending for insertion at its head portion between the foremost end face of the main lever and a bracket member and being operable in association with the main lever, and the third discloses an auxiliary lever fixed at its head to a main lever through a single pin.

However, in the first case of using the screw bolt, there is a defect such that the junction of both levers becomes weak. Also the main lever is subjected to the eccentric force of the brake operation of the auxiliary lever to thereby cause torsion on the pivot of the main lever, resulting in a brake action which is not smooth. In the second case, the defect is such that the main lever changes its position in the direction of the swinging motion whether or not the auxiliary lever is mounted to the bracket member, thereby considerably changing the distance between the handle bar and the grip of the main lever, and further the auxiliary lever is likely to be loose and unstable due to its one-point-support. In the third case, the problem is that the auxiliary lever is not easily removable and also unstable due to its one-point-support.

In order to overcome the aforesaid porblems, this invention has been designed. A main object of the invention is to provide a brake operating device capable of easily mounting or dismounting an auxiliary lever and of holding it in a stable manner. Another object of the invention is to provide a brake operating device in which the auxiliary lever is mounted at the rider's choice and which is available by the main lever without the auxiliary lever, and notwithstanding, the mounting of the auxiliary lever, the main lever position is kept constant in the swinging motion direction.

The brake operating device of the invention is so constructed that a hollow shaft is provided at the foremost end of the main lever supported swingably to a bracket member. The hollow shaft carries a retaining member holding one terminal of a control wire, the other terminal of which is connected to the bicycle brake. The auxiliary lever is mounted to the bracket member swingably around a pivot coaxial with a pivot through which the main lever swings and is provided at the head and with an engaging shaft parallel to the common axis of the pivots and insertable into the hollow shaft. The engaging shaft engages with the hollow shaft to thereby operate the auxiliary lever in association with the main lever.

The auxiliary lever is pivoted at its pivoting portion to the bracket member through the second pivot coaxial with the first pivot carrying the main lever, and is supported at the head insertably into the hollow shaft through the engaging shaft, thus being stable through a two-point-support.

Furthermore, the auxiliary lever, which is in association with the main lever through insertion of the engaging shaft into the hollow shaft, is easily mountable or removable to or from the bracket member, and also usable at the rider's choice. Furthermore, the auxiliary lever, when in use, is inserted at its head not between the bracket member and the front end face of the main lever as in the aforesaid prior art, but into the hollow shaft for operation in association with the main lever, resulting in the position of the main lever in the swinging motion direction being kept constant regardless of the existence of the auxiliary lever.

These and other objects and novel features of the invention will be apparent from the following description of an embodiment of the invention in accordance with the accompanying drawings.

BRIEF DESCRIPTION OF THE DRAWINGS

FIG. 5 is a sectional view taken on the line V—V in FIG. 2, FIG. 6 is a sectional view taken on the line VI—VI in FIG. 2, FIG. 7 is a sectional view taken on the line VII—VII in FIG. 2, FIG. 8 is a side view of an auxiliary lever, FIG. 9 is a front view thereof, FIG. 10 is a partial section view of a modified embodiment of the invention.

DETAILED DESCRIPTION OF THE INVENTION

Figures 1, 2:
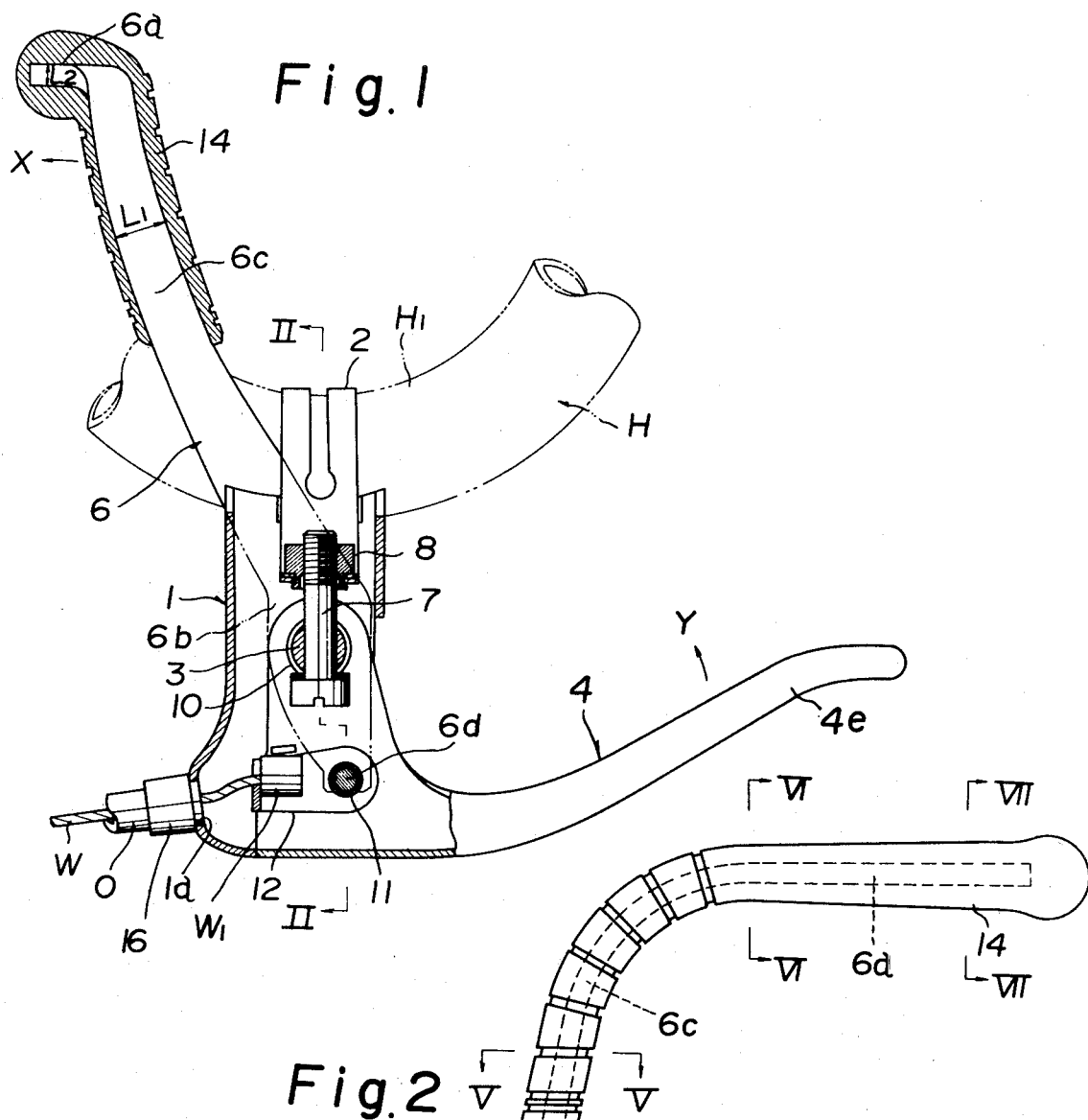
FIG. 1 is a longitudinally sectional side view of an embodiment of the invention.
FIG. 2 is a sectional view taken on the line II—II in FIG. 1, FIGS. 3 and 4 are perspective views of a retaining member.
Figure 11:
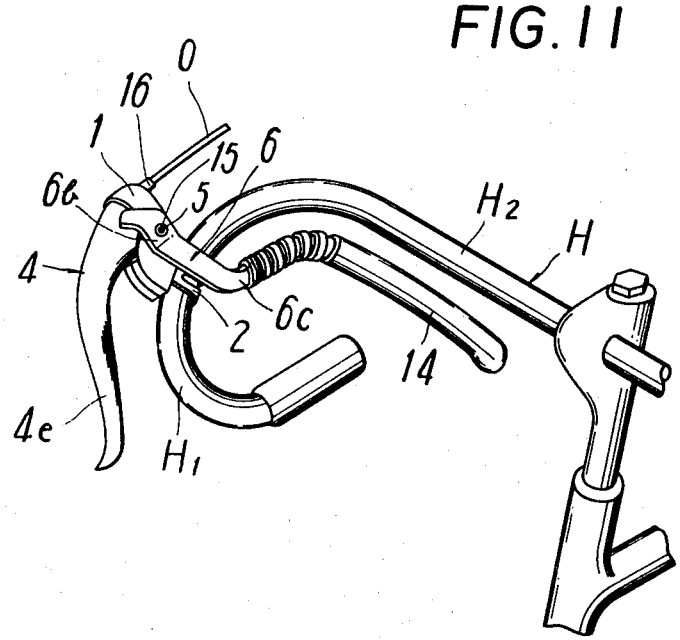
FIG. 11 is an overall view of a preferred embodiment of the invention.

A brake operating device according to the invention is comprised of a bracket member 1 fixed through a clip band 2 to a U-shaped bent rod section $H_1$ of a drop type handle bar H. The handle bar comprises a bent rod section $H_1$ and a straight rod section $H_2$. A main lever 4 is supported swingably to the bracket member 1 through a first pivot 3 fixed thereto, and an auxiliary lever 6 is supported swingably to the bracket member 1 through a second pivot 5 coaxial with the first pivot 3.

The bracket member 1 is formed in a substantially square prism-shape, opens rearward and upward, and is provided at the forward upward portion with a bore $1a$ through which a control wire W connected to the bicycle brake is inserted. At the central portions of two opposite side walls are provided two opposite through bores 1b and 1c, into which the first pivot 3 is rigidly inserted.

A tightening bolt 7 pierces the first pivot 3 perpendicularly thereto and at an axially intermediate portion of the pivot 3. The tip of bolt 7 is screwably tightened with a nut 8 retained to both edges of the band 2, so that the band 2 is raised and the bracket member 1 is lowered to thereby fix the bracket member 1 to the bent rod section $H_1$.

The main lever 4 is formed of a metallic plate bent in a U-shape and lengthwise curved along the bent rod section $H_1$. At the bases of both side walls of the main lever 4 are formed two opposite shaft bores 4a and 4b, into which a pair of bushings 9 and 10 are fit respectively, so that the main lever 4 is supported swingably to the first pivot 3 through the bushings 9 and 10. At the front ends of side walls are formed two opposite bores 4c and 4d, into which a hollow shaft 11 parallel to the first and second pivots 3 and 5 is inserted transversely of the main lever 4 and fixed into the bores 4c and 4d.

The hollow shaft 11 rotatably supports a retaining member 12 which holds a terminal $W_1$ of the control wire W.

The retaining member 12, as shown in FIGS. 3 and 4, is formed of a metallic plate bent in a U-shape, and is provided at both side walls with opposite round bores 12a and 12b which are fit onto the hollow shaft 11, whereby the retaining member 12 is supported rotatably thereto. In addition, the shaft bore 11a is not necessary to perforate through the hollow shaft 11, but enough to open at one axial end thereof. Alternatively, the hollow shaft 11 may comprise two stems which are fixed into the bores 4c and 4d respectively. In this instance, the respective stems can be formed integrally with each side wall by a pressing procedure. Also, the hollow shaft 11 may be integral with the retaining member 12.

The auxiliary lever 6 is substantially L-like shaped and comprises a gripping portion 6a substantially parallel to the straight rod section of handle bar H, a pivoting portion 6b extending along the bracket member 1, and a connecting portion 6c connecting the gripping portion 6a and pivoting portion 6b, the pivoting portion 6b having at the utmost end thereof an engaging shaft 6d insertable into the shaft bore 11a at the hollow shaft 11. The auxiliary lever 6 also is formed of a metallic plate by use of a punch press and bent in a L-like shape at a substantially lengthwise intermediate portion. The respective portions 6a, 6b and 6c are made rectangular in section, major sides of length $L_1$ at the sectional rectangle orient in the direction X of the swinging motion of the lever 6, and minor sides of length $L_2$ orient perpendicularly to the direction X, where the major and minor sides of a rectangular section at the gripping portion 6a are reverse in orientation to the pivoting portion 6b and connecting portion 6c. Alternatively, the auxiliary lever 6 may be forged or molded.

A ratio of lengths $L_1$ and $L_2$ is preferred to be about 2:1 or more, which is not strictly required because the strength of the auxiliary lever 6 depends largely upon the formation of and material for the lever.

Referring to FIGS. 5 to 7, a rectangular section at each portion of the auxiliary lever 6 is shown, but the section may be elliptic or round.

At the pivoting portion 6b of auxiliary lever 6 is provided a shaft bore 61 into which a bushing 13 is fit, through which bushing the auxiliary lever 6 is swingably supported to the second pivot 5. The engaging shaft 6d at the utmost end of the pivoting portion 6b insertably engages with the shaft bore 11a at the hollow shaft 11, whereby the auxiliary lever 6 can operate in association with the main lever 4. The engaging shaft 6d, as shown in FIG. 2, is formed of an extension from the pivoting portion 6b and shaped round or polygonal in section by pressing. Alternatively, the engaging shaft 6d may be separate from the pivoting portion 6b and fixed thereto by welding or the like. In addition, a grip 14 of synthetic resin and molded in an one-end-closed tubular shape is sleeved onto the gripping portion 6a. Or, the grip 14 may be formed in a C-shape in section and attached to the gripping portion 6a by adhesives, and also may be formed of rubber or fabrics.

The second pivot 5, as shown in FIG. 2, is formed of an extension integral with the first pivot 3 and projecting outwardly from one side wall of the bracket member 1. Besides this, the pivot 5, as shown in FIG. 10, may be separate from the first pivot 3 and fixed to one axial end thereof through fixing means, such as screw means. In this instance, a threaded bore 31 is provided at the end face of first pivot 3 and a screw thread 51 screwable with the threaded bore 31 is provided at the outer periphery of second pivot 5.

A snap ring 15 shown in FIG. 2 is detachably mounted to the axial end of second pivot 5. The second pivot 5 has the head 52 as shown in FIG. 10. The snap ring 15 is removed, or the second pivot 5 is unscrewed through the head 52 to thereby remove the auxiliary lever 6 with ease from the bracket member 1.

When the auxiliary lever 6 is removed by removing the snap ring 15 in FIG. 2, the second pivot 5 remains, but when the second pivot 5 shown in FIG. 10 is unscrewed and removed together with the auxiliary lever 6, no projection remains, whereby use of the second screwed pivot 5 is more advantageous. In this instance, a flanged plug (not shown) is screwed with the threaded bore 31. Incidentally, a support 16 for an outer cable O guiding the control wire W is shown in FIG. 1.

The brake operating device of the invention constructed as foregoing is, when in use, mounted to the bent rod section $H_1$ of the drop type handle bar H through the bracket member 1. When a rider tries to actuate the brake during the bicycle's running while gripping by hands the straight rod section of the handle bar H, he can stretch his fingers from his hand at the abovementioned position for gripping the grip 14 at the gripping portion 6a of auxiliary lever 6 together with the straight rod section. The auxiliary lever 6, as shown in FIG. 1, is operated to swing around the second pivot 5 in the direction of the arrow X in FIG. 1, and simultaneously, the main lever 4 in association with the auxiliary lever 6 swings around the first pivot 3 in the direction of the arrow Y in FIG. 1, whereby the wire W retained to the retaining member 12 is pulled in the direction of the arrow Z so as to actuate the brake.

When the rider tries to actuate the brake during the bicycle's running while gripping the bent rod section $H_1$ opposite to the main lever 4, he can stretch his fingers from the aforesaid position to grip the gripping portion 4e at the main lever 4 together with the bent rod section $H_1$, whereby the main lever 4 swings in the direction of the arrow Y and simultaneously the wire W is pulled to exert the brake action.

As clearly understood from the aforesaid description, the brake operating device of the invention is so constructed that the shaft pivotally supporting the retaining member for the control wire is made hollow and an extension from the front end of the auxiliary lever is formed in the engaging shaft, so that the engaging shaft engages with the hollow shaft to operate both the levers in association with each other. Hence, the auxiliary lever is supported at two points where the auxiliary lever is supported to the bracket member and engages at the engaging shaft with the hollow shaft, thereby reliably eliminating looseness of the auxiliary lever. Furthermore, the auxiliary lever operates in association with the main lever at the portion pivotally supporting the retaining member, whereby the main lever position is always constant regardless of existence of the auxiliary lever.

Also, the associating portion of the auxiliary lever with the main lever is not fixed but in engagement only to thereby facilitate mounting and dismounting of the auxiliary lever.

While a preferred embodiment of the invention has been described using specific terms, such description is for illustrative purpose only, and it is to be understood that changes and variations may be made without departing from the spirit or scope of the following claims.

What is claimed is:

1. A brake operating device adapted to be mounted to a bicycle drop type handle bar having a straight rod section and U-like shaped bent rod sections extending forwardly and downwardly from both ends of the straight rod section, and used for operating the brake of the bicycle through a control wire, said device comprising,
   (a) a bracket member fixed to said bent rod section of said handle bar, said bracket member having first and second pivots coaxial with each other,
   (b) a main lever mounted swingably to said bracket member through said first pivot and extending along said bent rod section of said handle bar, said main lever having two side walls and at the foremost end a hollow shaft extending in parallel to said first and second pivots and perforating through said main lever transversely thereof,
   (c) a retaining member supported to said hollow shaft at said main lever and holding a terminal of said control wire, and
   (d) an auxiliary lever mounted to said bracket member through said second pivot in relation of being swingable with said main lever, said auxiliary lever having a gripping portion substantially parallel to said straight rod section at said handle bar and a pivoting portion substantially parallel to said bent rod section at said handle bar, said pivoting portion having at the head portion thereof an engaging shaft parallel to the common axis of said first and second pivots and insertable into said hollow shaft, said engaging shaft being inserted into said hollow shaft to thereby engage said main lever with said auxiliary lever in a relationship for operating each of said levers together.

2. A brake operating device according to claim 1, wherein said bracket member has two opposite side walls, between said side walls is fixed said first pivot and said main lever is disposed so that said first pivot swingably carries said main lever, and said second pivot is integral with said first pivot and is projecting outwardly from the outer surface of one of said side walls, said second pivot swingably supporting said auxiliary lever.

3. A brake operating device according to claim 1, wherein said bracket member has two opposite side walls, between said side walls is fixed said first pivot and is disposed said main lever so that said first pivot swingably supports said main lever, and said second pivot is formed separately from said first pivot and fixed to an axial end thereof through fixing means.

4. A brake operating device according to claim 3, wherein said fixing means comprises screw means and said first pivot is provided with a threaded bore and said second pivot is provided with a screw thread screwable with said threaded bore.

5. A brake operating device according to claim 1, wherein said gripping portion and pivoting portion of said auxiliary lever are formed in rectangular section respectively, major sides of said rectangular section being oriented in the direction of said auxiliary levers swinging motion, minor sides of said rectangular section orienting perpendicularly to the direction of said auxiliary lever swinging motion.

6. A brake operating device according to claim 1 or 5, wherein a grip body is mounted to said gripping portion of said auxiliary lever.

* * * * *